(12) United States Patent
Beck et al.

(10) Patent No.: US 11,521,313 B2
(45) Date of Patent: Dec. 6, 2022

(54) METHOD AND SYSTEM FOR CHECKING DATA GATHERING CONDITIONS ASSOCIATED WITH IMAGE-DATA DURING AI ENABLED VISUAL-INSPECTION PROCESS

(71) Applicant: PANASONIC INTELLECTUAL PROPERTY MANAGEMENT CO., LTD., Osaka (JP)

(72) Inventors: Ariel Beck, Singapore (SG); Chandra Suwandi Wijaya, Singapore (SG); Athul M. Mathew, Singapore (SG); Nway Nway Aung, Singapore (SG); Ramdas Krishnakumar, Singapore (SG); Zong Sheng Tang, Singapore (SG); Yao Zhou, Singapore (SG); Pradeep Rajagopalan, Singapore (SG); Yuya Sugasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 175 days.

(21) Appl. No.: 17/173,822

(22) Filed: Feb. 11, 2021

(65) Prior Publication Data
US 2022/0253995 A1    Aug. 11, 2022

(51) Int. Cl.
*G06V 10/75* (2022.01)
*G06T 7/00* (2017.01)
(Continued)

(52) U.S. Cl.
CPC .......... *G06T 7/001* (2013.01); *G06V 10/464* (2022.01); *G06V 10/60* (2022.01); *G06V 10/751* (2022.01); *G06T 2207/20224* (2013.01)

(58) Field of Classification Search
CPC .......... G06T 7/001; G06T 2207/20224; G06V 10/464; G06V 10/60; G06V 10/751
See application file for complete search history.

(56) References Cited

U.S. PATENT DOCUMENTS

| 6,438,256 B1 * | 8/2002 | Rubin | G01N 21/5911 |
| | | | 358/448 |
| 7,620,211 B2 * | 11/2009 | Browne | H04N 1/0005 |
| | | | 356/435 |

(Continued)

FOREIGN PATENT DOCUMENTS

JP    2008205635 A   *  9/2008

OTHER PUBLICATIONS

Translated Version of JP2008205635 (Year: 2008).*

*Primary Examiner* — Carol Wang
(74) *Attorney, Agent, or Firm* — McDermott Will & Emery LLP

(57) ABSTRACT

A method and system for checking data gathering conditions or image capturing conditions associated with images during AI based visual-inspection process. The method comprises generating a first representative (FR1) image for a first group of images and a second representative image (FR2) for a second group of images. A difference image data is generated between FR1 image and the FR2 image based on calculating difference between luminance values of pixels with same coordinate values. Thereafter, one or more of a plurality of white pixels or intensity-values are determined within the difference image based on acquiring difference image data formed of luminance difference-values of pixels. An index representing difference of data-capturing conditions across the FR1 image and the FR2 image is determined, said index having been determined at least based on (Continued)

the plurality of white pixels or intensity-values, for example, based on application of a plurality of AI or ML techniques.

17 Claims, 12 Drawing Sheets

(51) Int. Cl.
*G06V 10/60* (2022.01)
*G06V 10/46* (2022.01)

(56) References Cited

U.S. PATENT DOCUMENTS

| | | |
|---|---|---|
| 10,192,300 B2 | 1/2019 | Amano et al. |
| 2016/0234429 A1 | 8/2016 | Cho |

\* cited by examiner

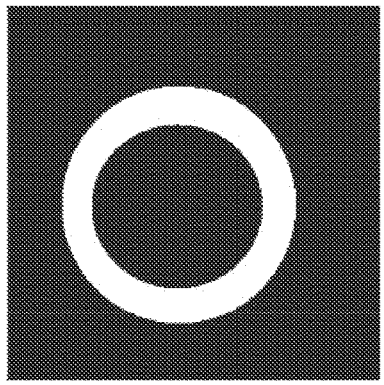
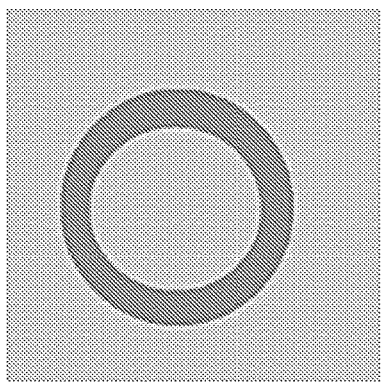
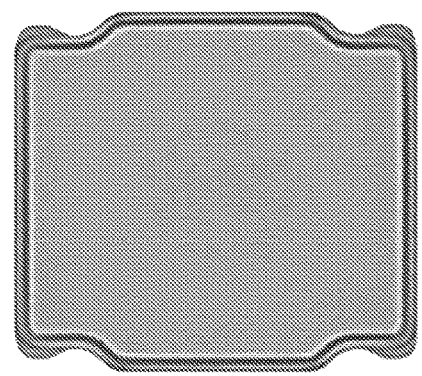
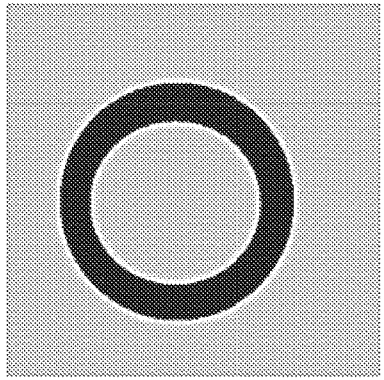
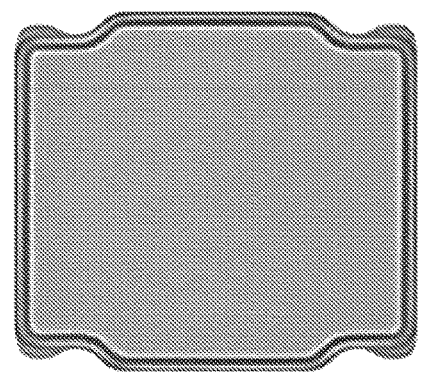
(a)
(b)
Fig. 6

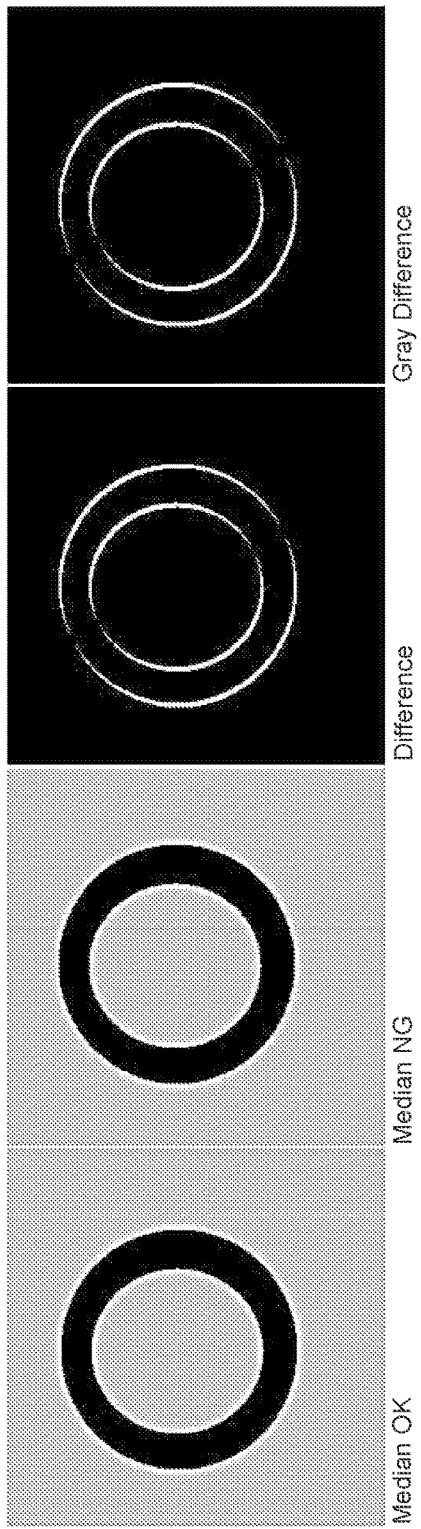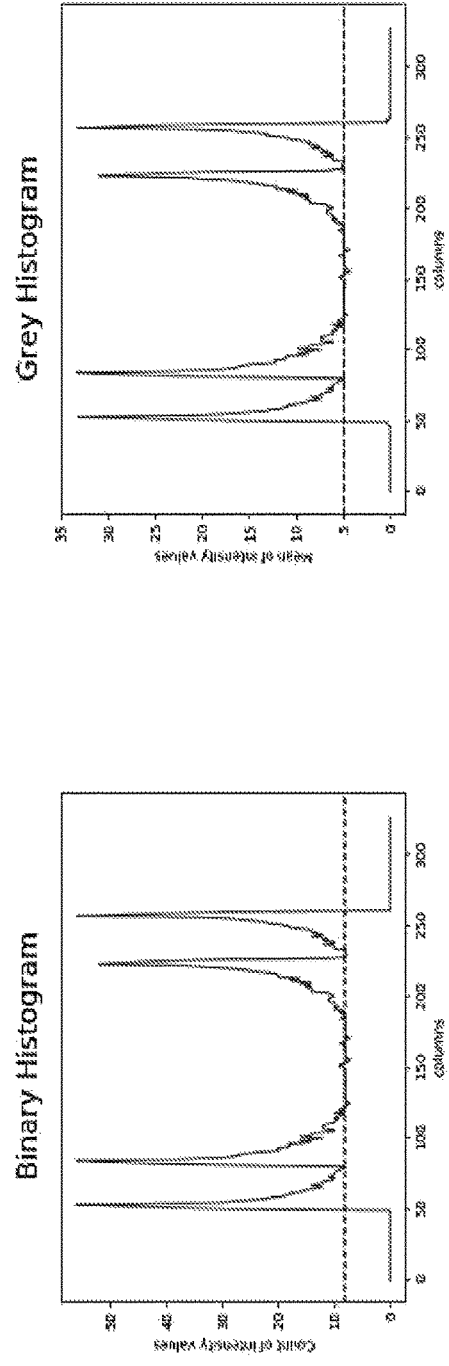
Fig. 8A

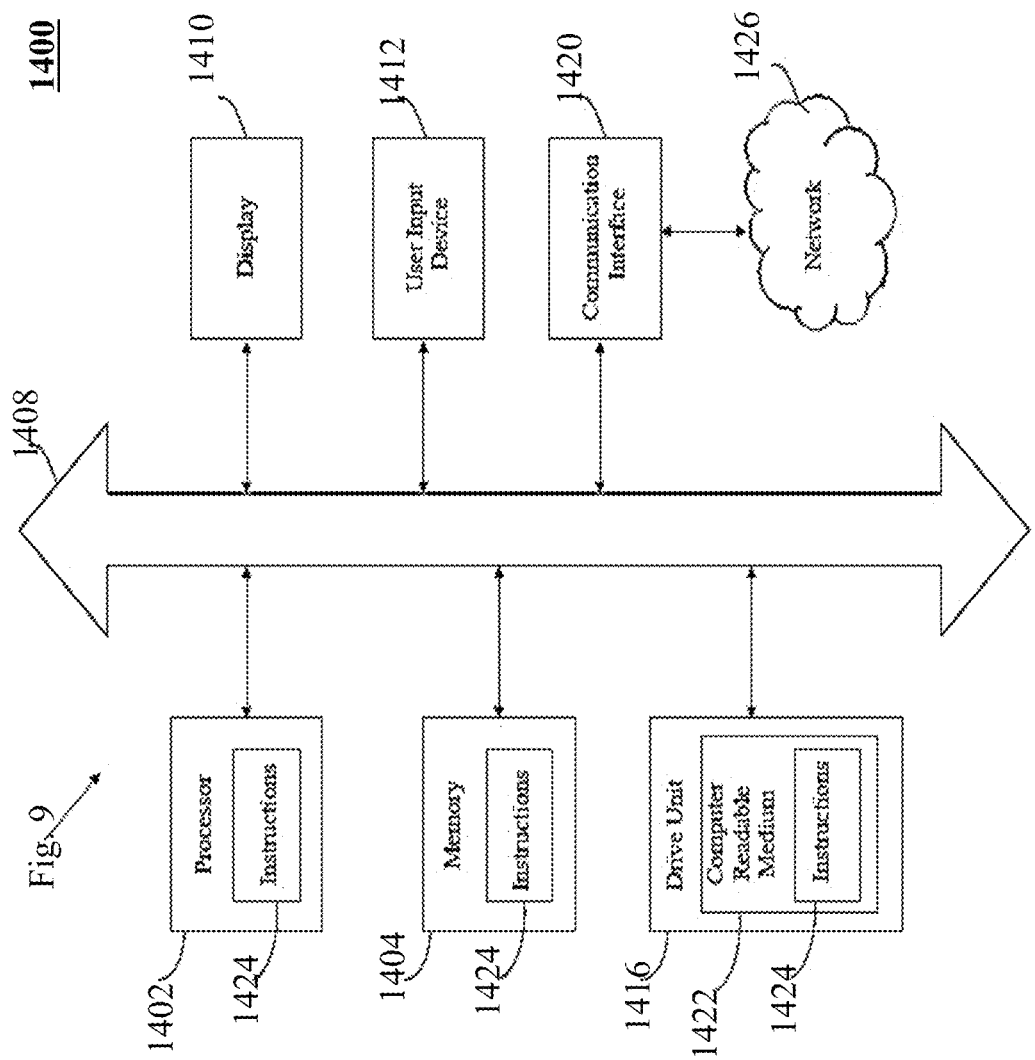

METHOD AND SYSTEM FOR CHECKING DATA GATHERING CONDITIONS ASSOCIATED WITH IMAGE-DATA DURING AI ENABLED VISUAL-INSPECTION PROCESS

TECHNICAL FIELD

The present invention generally relates to artificial-intelligence (AI) enabled visual-inspection, and specifically towards creating a dataset for said classification.

BACKGROUND

Automatic Visual Inspection of defects using Machine Learning has been into existence for some time. Example architectures include artificial intelligence (AI) techniques, deep-learning architectures to accomplish the automatic visual-inspection of various materials as a part of quality control process. Further examples include semi-automatic A.I. enabled visual inspection processes wherein a part of visual inspection may be rendered by human being by providing user inputs to facilitate the operation of the A.I. enabled visual inspection process.

At least an expectation from the state of the art aforesaid A.I. models is to recognize the actual-defects rather than capturing false-defects as emanating from different data collection conditions. At least a reason behind such different data capturing conditions is that the data collected for inspection by the AI model may come from different lines of production and the lighting condition also varies across a period. However, the state of the art AI models tend to ignore such disparities.

Accordingly, if the presence of variance in the data capturing conditions is left unchecked, it can lead to misleading model performance. In other words, the A.I. enabled visual inspection model misidentifies resulting aberrations due to lightening-condition as defects and tends to pick-up false defects apart from the actual-defects.

Overall, in case of non-similarity of the data collection conditions across different classes, e.g. lighting condition, mis-focus, camera alignment, blur and so on, the conventional techniques fail to automatically adjust the images to compensate for the different conditions such as lightings. State of the art mechanisms fail to enable the A.I. model to only focus upon the actual defects within a given dataset.

There lies a need for a long-term system maintenance mechanism that can detect changes in capturing conditions and automatically raise a flag or apply compensation/correction techniques when such conditions are detected.

There lies a need to ensure that A.I. models are not biased by different capturing conditions, and to work on the training data set and on the long term maintenance of the A.I. enabled visual inspection systems.

SUMMARY

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein, describes method and system for predicting or classifying imaging condition of any material or object or any imaging feature/attribute related to the material/object either in a fully automated environment or through a semi-automatic mechanism.

The present subject matter refers method for checking data gathering conditions or image capturing conditions associated with images of various objects as a part of AI based visual-inspection process. The method comprises generating a first representative (FR1) image for a first group of images and a second representative image (FR2) for a second group of images. A difference image data is generated between FR1 image and the FR2 image based on calculating the difference between luminance values of pixels with the same coordinate values. Thereafter, one or more of a plurality of white pixels or intensity-values are determined within the difference image based on acquiring difference image data formed of luminance difference-values of pixels. An index representing a difference of data-capturing conditions across the FR1 image and the FR2 image is determined, said index having been determined at least based on the plurality of white pixels or intensity-values.

In other embodiment, the present subject matter refers to a method for correcting image data based on checking data gathering conditions associated with image data. Such corrections may be performed during data collection stage as a part of an AI based visual-inspection process. The data collection processes may be different due to different locations, different factories, etc. The method comprises generating a first representative (FR1) image for a first group of images and a second representative image (FR2) for a second group of images and generating a difference image data between FR1 image and the FR2 image based on calculating the difference between luminance values of pixels with same coordinate values. One or more of a plurality of white pixels or intensity-values are determined within the difference image based on acquiring difference image data formed of luminance difference values of pixels. An index representing a difference of data-capturing conditions across the FR1 image and the FR2 image is determined such that said index is determined at least based on the plurality of white pixels or intensity-values. Based on the determined index, automatically correcting is executed for one or more of the images pertaining to the respective classes of either the FR1 image or the FR2 image, at least one of: a detected misalignment, a detected illumination variation within aligned or misaligned images, and a detected blur.

At least by virtue of aforesaid, the present subject matter enables automatically rating of the similarity of the data collection conditions across different classes. Thereafter, the detected data capturing conditions such as lighting conditions and alignment are automatically adjusted within the images to compensate for the different-lightings.

The objects and advantages of the embodiments will be realized and achieved at least by the elements, features, and combinations particularly pointed out in the claims. It is to be understood that both the foregoing general description and the following detailed description are representative and explanatory and are not restrictive of the invention, as claimed.

BRIEF DESCRIPTION OF THE DRAWINGS

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

FIG. 6 represents the computation of the difference image, in accordance with an embodiment of the present disclosure;

FIGS. 8A and 8B represent detecting the misalignment or difference in lighting as data capturing conditions in accordance with another embodiment of the present disclosure;

FIG. 11 illustrates an implementation of the system as illustrated in preceding figures in a computing environment, in accordance with another embodiment of the present disclosure.

Figure 1:
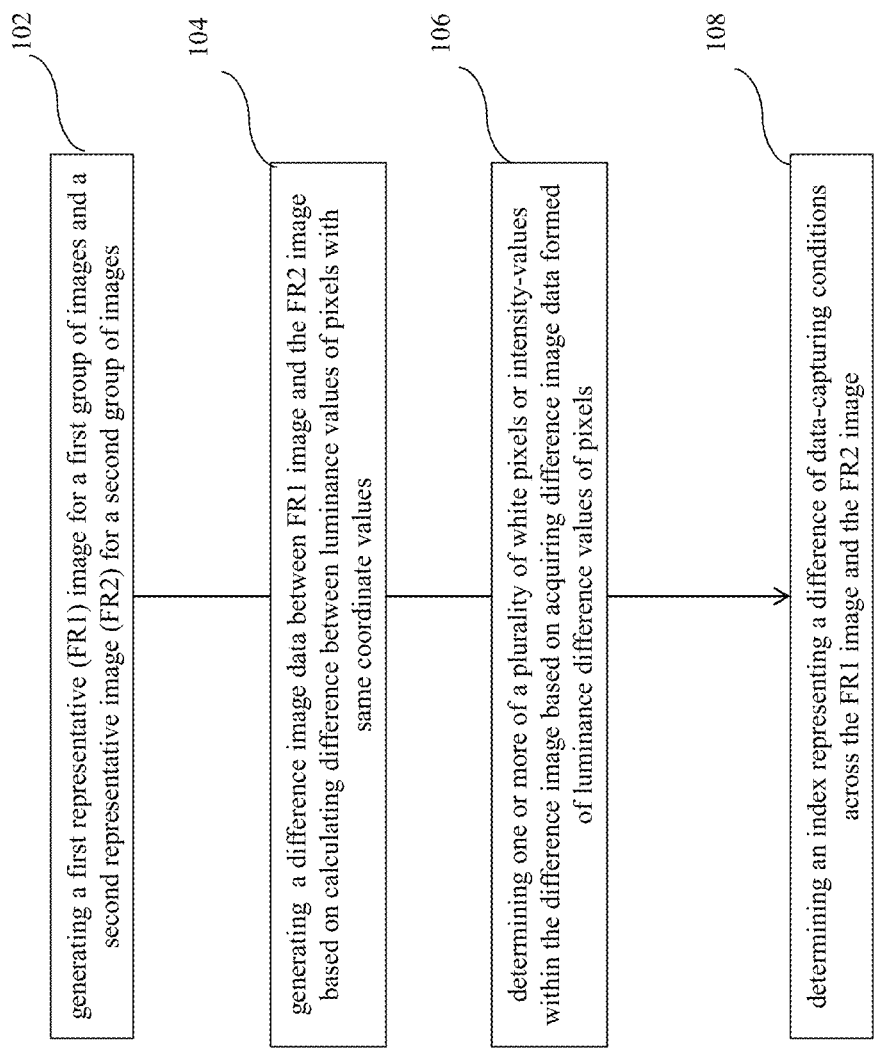
FIG. 1 illustrates method steps in accordance with the embodiment of the present disclosure.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present subject matter are described below in detail with reference to the accompanying drawings.

FIG. 1 illustrates a method for checking data gathering conditions associated with image data during AI based visual-inspection process. The method comprises generating (step 102) a first representative (FR1) image for a first group of images and a second representative image (FR2) for a second group of images. In an embodiment, the FR1 image and the FR2 image are generated from an aligned dataset defined by median-images of the first and second groups of images, respectively, and wherein the FR1 image and the FR2 image represent either an entire object or region of interest (ROI).

Each of the FR1 image and the FR2 image may be evaluated for recommending one or more image features within the FR1 image and the FR2 image. The evaluation comprises detecting a plurality of interest-points within each of the FR1 and FR2 image and thereby a repeatability rate is determined with respect to the detected plurality of interest points with respect to the FR1 and FR2 image, said repeatability rate defining a geometrical stability criteria. Further, a sub-plurality of interest-points corresponding to said repeatability-rate may be ascertained with respect to the FR1 and FR2 image. The sub-plurality of interest points are identified as one or more image-features defined by one or more of corners, edges, ridges in accordance with a standard library of key-point features.

Further, the method comprises generating (step 104) a difference image data between FR1 image and the FR2 image based on calculating difference between luminance values of pixels with same coordinate values. The difference image may be binary image or grayscale image. The FR1/FR2 images represent a median-image for each class which in turn represents a clean representation with no defect (i.e. median image).

Further, the method comprises determining (step 106) one or more of a plurality of white pixels or intensity-values within the difference image based on acquiring difference image data formed of luminance difference values of pixels. The determining of the white pixels or intensity values comprises locating the white pixel as at least one error pixel in a binary-image acting as the difference image, and locating the intensity region in a grayscale image acting as the difference image.

Further, the method comprises determining (step 108) an index representing a difference of data-capturing conditions across the FR1 image and the FR2 image, said index determined at least based on the plurality of white pixels or intensity-values. The determination of the index with respect to the binary image comprises computing an overall index based on a ratio of a number of white pixels forming part of a blob and a total number of pixels within the binary image. The overall index comprises a lighting-index defined by a ratio of a number of large blobs and the total number of pixels, said large blob defined by a height and width above a pre-defined threshold. An alignment index is defined by a ratio of a number of narrow blobs and the total number of pixels, said narrow blob defined by a height and width below a pre-defined threshold.

In an example, the determination of the index representing a difference of data-capturing conditions with respect to the binary-image and grayscale-image comprises calculating a difference in illumination based index between the FR1 image and the FR2 image based on counting a number of error points per column in the binary image and thereby calculating a median of the count of a high intensity per column of the binary image. In another example, the method comprises calculating a mean intensity per column in the greyscale image and thereby calculating a median of mean intensity per column for the greyscale image.

The calculated-medians of the binary-image and grayscale image act as the difference in illumination index. A difference in illumination in either of the FR1 image or the FR2 image is calculated if the calculated difference in the illumination index is above a pre-defined threshold. A misaligned condition is ascertained in either of the FR1 image or the FR2 image based on at least one of a) the differences in illumination index being below a pre-defined threshold, and b) the computed overall index is above a pre-defined threshold and thereby depicts an error.

Further, as a part of image correction techniques, the method comprises analyzing a spread of blobs within the difference image as below a pre-defined threshold and existent along with one of the identified interest points, each of said blob representing a group of white pixels within the difference image. An alignment quality index is determined with respect to either one of the FR1 image or the FR2 image as above tolerance based on the analysis of the spread of blobs.

The detected misalignment is automatically corrected for one or more of the images corresponding to the classes of either the FR1 image or the FR2 image. The automatic correction of the detected misalignment is accomplished based on extracting one or more scale invariant (SIFT) image features from one of the FR1 image or the FR2 image in intensity space. The one or more scale invariant image features are mapped with a plurality of correspondence interest points determined based on a deep learning criteria applied over one or more of the FR1 image or the FR2 image. One or more of the images corresponding to the classes of the FR1 image or the FR2 image are aligned using the correspondence interest points.

Further, as a part of image correction techniques, the method comprises analyzing a spread of blobs within the difference image as above a pre-defined threshold and existent along one of the identified interest points, each of said blob representing a group of white pixels within the difference image. An illumination quality index is detected with respect to either one of the FR1 image or the FR2 image as above tolerance value based on the analysis of the spread of the blobs. A detected illumination variation is automatically corrected based on the illumination quality index for one of the FR1 image or the FR2 image. The detected illumination variation is automatically corrected for one or more misaligned images corresponding to the classes of the FR1 image or the FR2 image based on deep-learning enabled image to image translation techniques, said translation techniques configured to capture characteristic of the lightning condition pertaining to one group of images and reconstruct it to another group of images.

In respect to the aligned dataset, the detected illumination variation for the FR1 image or an FR2 image corresponding to an aligned dataset is automatically corrected. With respect to a particular image in class 2 which refers the second group of images, difference between the FR1 image and the particular image under consideration is computed to yield another difference image. A plurality of blobs are located within the another difference image. Each of said blob represents the group of white pixels within the difference image. The blobs as located are indexed in terms of regions. For a particular blob region (e.g. region i in the difference image), a difference is computed between the region of the FR1 image and the region of a particular image within the second group of images. Thereafter, a pixel value for the blob under consideration is varied for the particular image of the second group of images if the computed difference for the blob under consideration is greater than a tolerance value. The variation of a pixel value for the particular image under consideration is performed till the computed difference for the blob under consideration is less than the tolerance value. Thereafter, the steps are re-executed for the remaining images in the second group to thereby cause illumination correction of the aligned one or more images corresponding to the class of FR2 image.

Further, as a part of image correction techniques, the method further comprises analyzing a spread of blobs within the difference image as above a pre-defined threshold and existent along one of the identified interest point, each of said blob representing a group of white pixels within the difference image. A blur quality index is detected with respect to either one of the FR1 image or the FR2 image as above a tolerance based on the analysis of the spread of the blobs. The blur quality is automatically corrected based on the detected blur quality index for one of the FR1 image or the FR2 image by refocussing of the imaging device by the operator.

Figure 2:
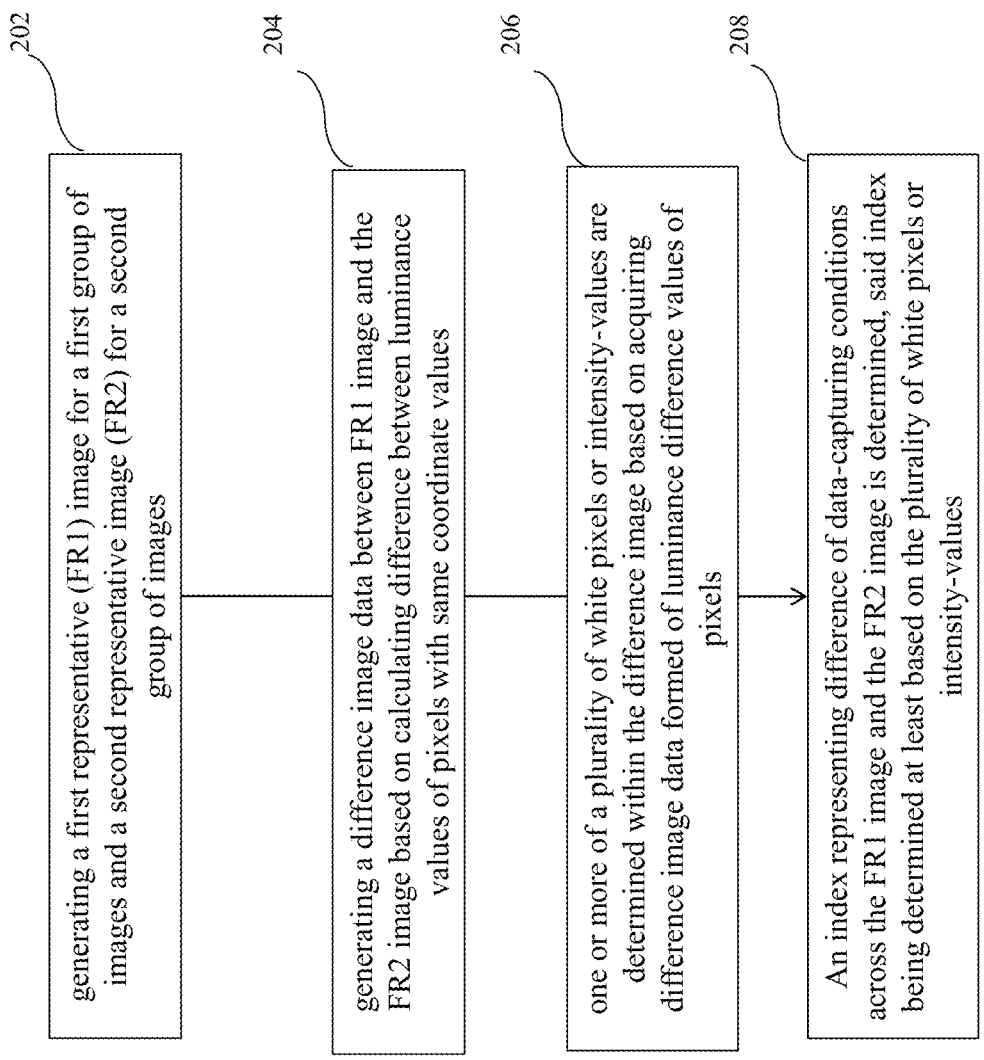
FIG. 2 illustrates method steps in accordance with another embodiment of the present disclosure.

FIG. 2 refers a method for correcting image data based on checking data gathering conditions associated with image data during A.I. based visual-inspection process.

The method comprises generating (step 202) a first representative (FR1) image for a first group of images and a second representative image (FR2) for a second group of images and based thereupon generating (step 204) a difference image data between FR1 image and the FR2 image based on calculating difference between luminance values of pixels with same coordinate values. Based thereupon, one or more of a plurality of white pixels or intensity-values are determined (step 206) within the difference image based on acquiring difference image data formed of luminance difference values of pixels.

An index representing difference of data-capturing conditions across the FR1 image and the FR2 image is determined (step 208), said index being determined at least based on the plurality of white pixels or intensity-values. Thereafter, for one of the FR1 image or the FR2 image an automatic correction is performed based on the determined index. The automatic correction may be performed based on at least one of: a detected misalignment, a detected illumination variation within aligned or misaligned images, and a detected blur.

Figure 3:
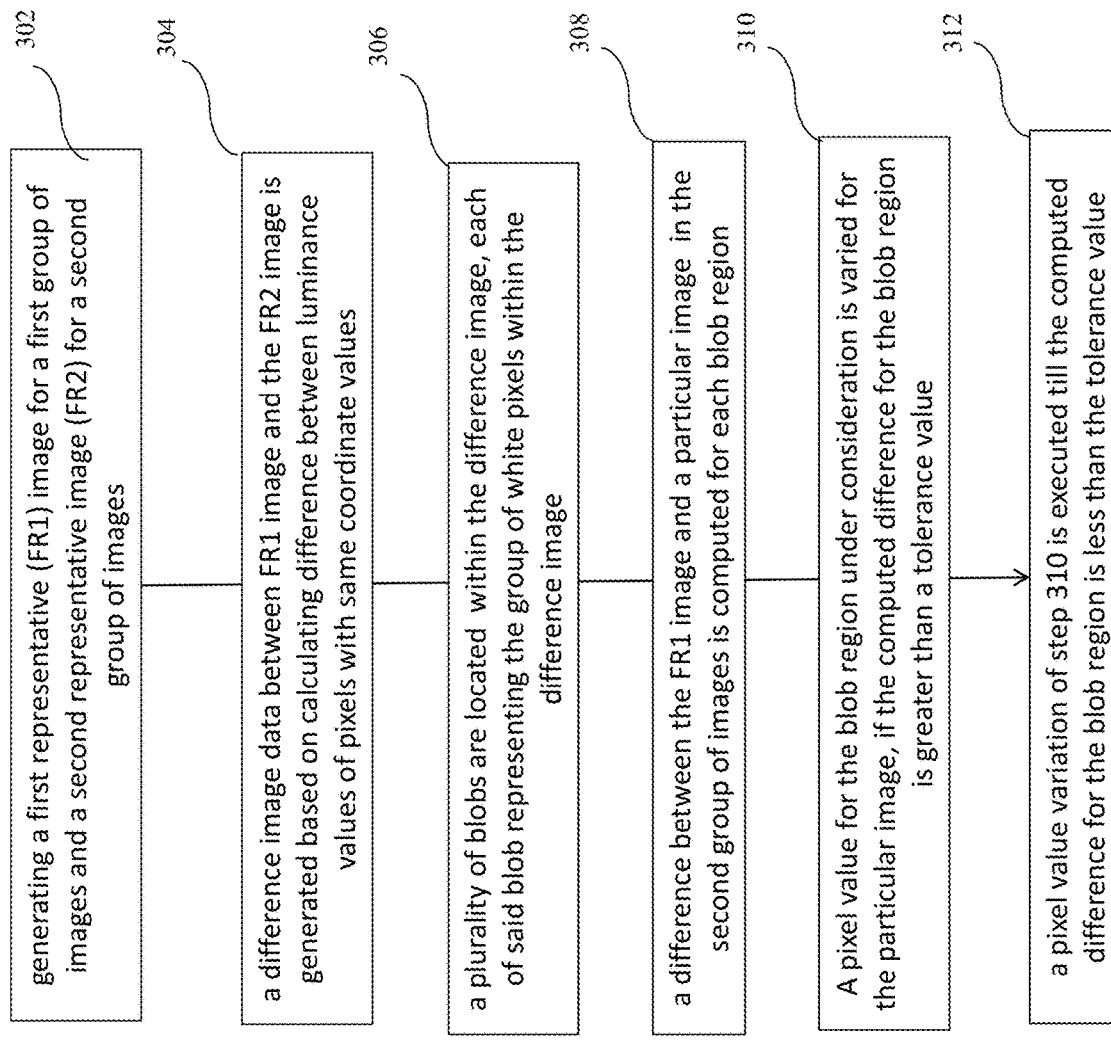
FIG. 3 illustrates method steps in accordance with yet another embodiment of the present disclosure.

FIG. 3 illustrate a method for correcting illumination-variation conditions associated with image data during AI based visual-inspection process. Such corrections may be performed during data collection stage as a part of an AI based visual-inspection process. The data collection processes may be different due to different locations, different factories, etc. The method comprises generating (step 302) a first representative (FR1) image for a first group of images and a second representative image (FR2) for a second group of images. Further, a difference image data between FR1 image and the FR2 image is generated (step 304) based on calculating difference between luminance values of pixels with same coordinate values and based thereupon an illumination variation for the FR2 image is detected.

For correction of the illumination variation, a difference between the FR1 image and a particular image of the second group of images is computed (step 306) to yield another difference image. A plurality of blobs are located within the another difference image, each of said blob representing the group of white pixels within the difference image. For each blob region corresponding to the another difference image, a difference between the FR1 image and a particular image of second group of images is computed (step 308). A pixel value for the blob region under consideration is varied (step 310) for the particular image of the second group of images, if the computed difference for the blob under consideration is greater than a tolerance value. The variation of a pixel value is executed (step 312) till the computed difference for the blob region under consideration of the particular image is less than the tolerance value. The steps are repeated for other images in the second group of images, and thereby illumination variation for the FR2 image is corrected.

Figure 4:
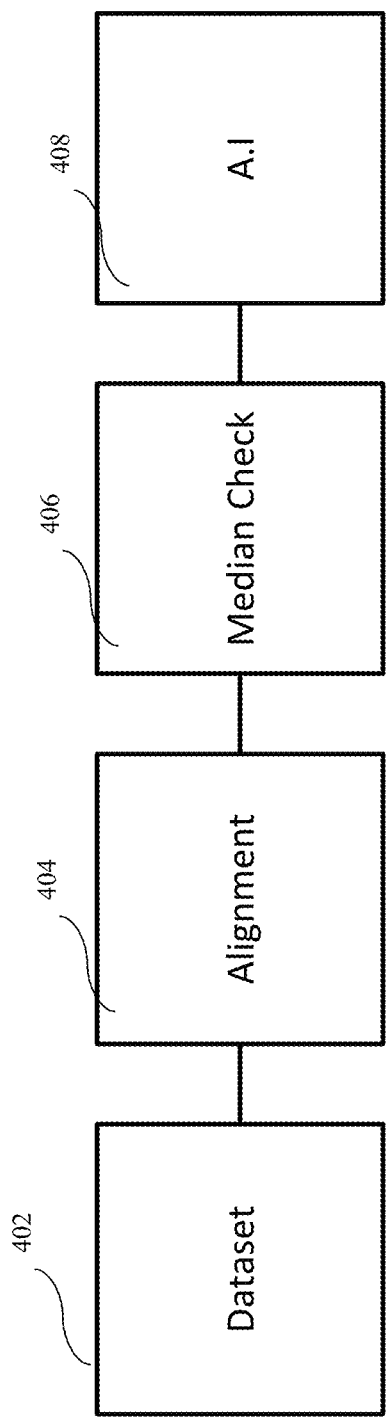
FIG. 4 illustrates a control flow for automatic-lighting and alignment-check, in accordance with an embodiment of the present disclosure.

FIG. 4 illustrates a control flow for automatic-lighting and alignment-check and accordingly corresponds to steps 102, 104, 202, 204 and 302, 304 of FIG. 1, FIG. 2 and FIG. 3, respectively.

Step 402 corresponds to receipt of a dataset for visual inspection. The dataset may correspond to images of objects as captured.

Step 404 corresponds to the alignment of objects within the image dataset as received in step 402 through state of the art AI and non-AI enabled automatic or semi-automatic alignment techniques. In an example, the semi-automatic techniques comprise user annotation of the point of interest within the image, and based thereupon the objects within the images are aligned within the image frame.

Based on the alignment, the aligned images dataset may be automatically categorized under various categories such as OK, or Not Good (NG).

Step 406 corresponds to computation of median image or the representative image class 1, e.g. OK (absence of defect) and computation of a median image for another Class 2 e.g. NG which denotes the presence of defect such as a scratch. In other words, a first representative (FR1) image for a first group of images and a second representative image (FR2) for a second group of images are generated. The FR1 image and the FR2 image represent either an entire object or region of interest (ROI). Each median image FR1 and FR2 represent a clean representation with no defect (i.e. median image).

Figure 5:
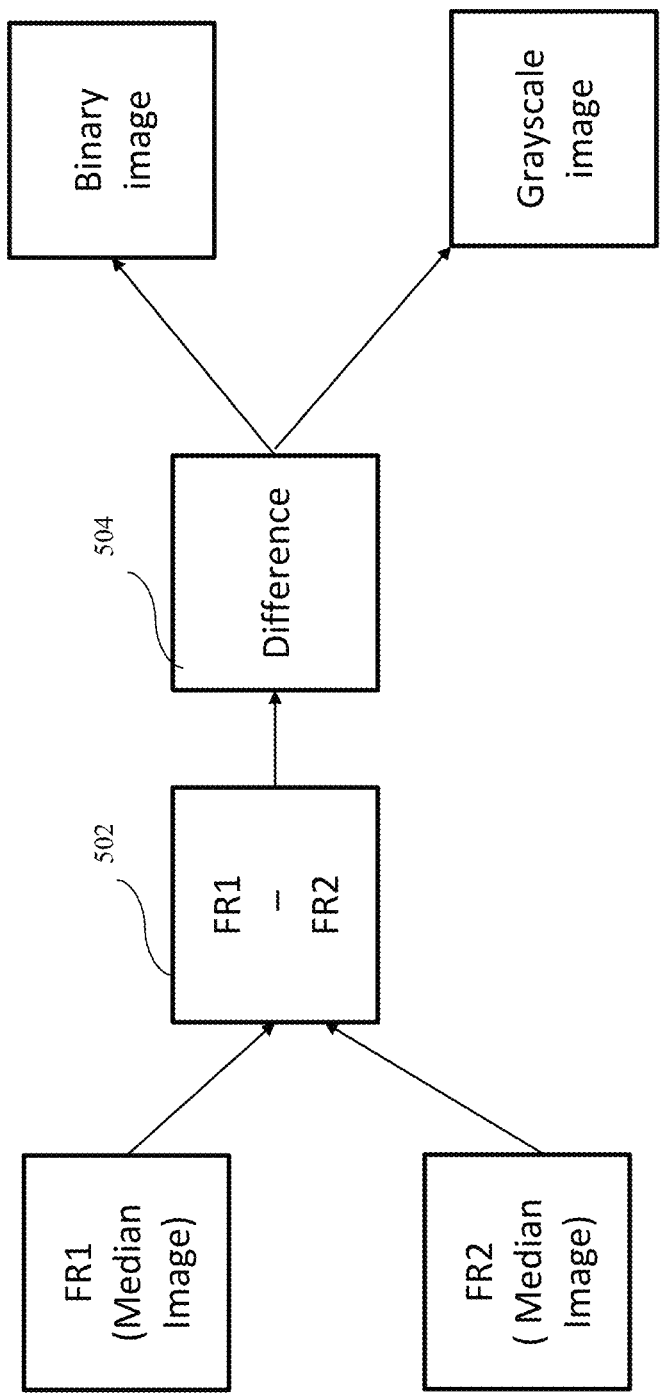
FIG. 5 illustrates the computation of necessary images and thereby determination of a variety of indexes related to the data-capturing conditions in accordance with the embodiment of the present disclosure.
Figure 7:
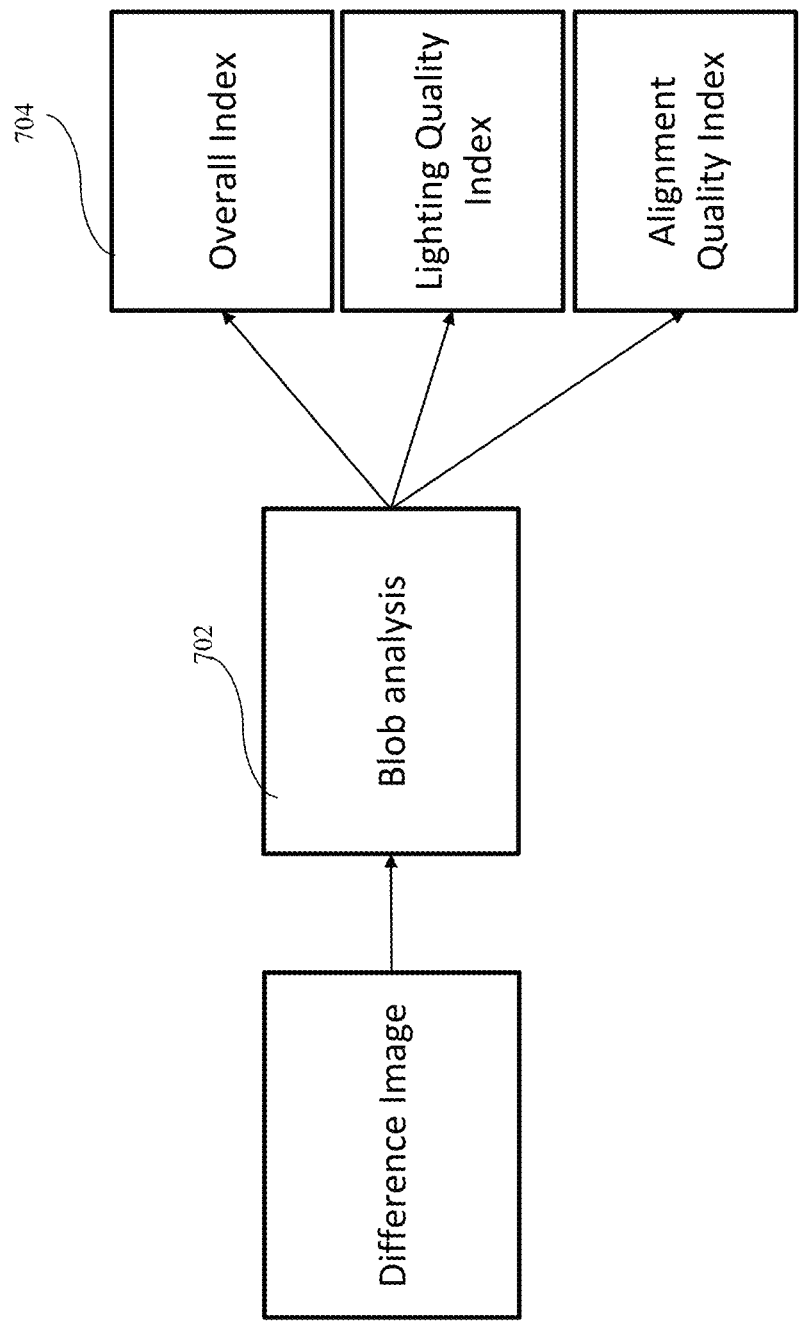
FIG. 7 represents an analysis of blobs comprising one or more error pixel or while pixels with respect to the difference image, in accordance with another embodiment of the present disclosure.

Step 408 corresponds to additional AI driven processes (i.e. index calculation and analysis) upon the median images of step 406 in accordance with the description of FIG. 5 till FIG. 7.

FIG. 5 illustrates the computation of necessary images and thereby determination of a variety of indexes related to the data-capturing conditions. The indexes describe whether there is a problem or not due to difference in data-capturing conditions and which type of problem.

Step 502 corresponds to generation of difference between the FR1 image and the FR2 image. Specifically, a difference image data is generated between the FR1 image and the FR2 image based on calculating difference between luminance values of pixels with same coordinate values. Image subtraction may be used to quantify the difference in conditions. This step can be visually interpreted by an operator or interpreted automatically by using threshold and non-zero pixels location.

Step 504 corresponds to a representation of the generated difference image in step 502 as a binary image or a grayscale image.

FIG. 6 represents the computation of the difference image in accordance with step 504 and the representation of the difference image through the binary image. FIG. 6a represents a generation of the binary image as the difference image and thereby depicts the white pixels or error pixels as difference between the two images. FIG. 6b represents a scenario wherein FR1 and FR2 both correspond to the same or similar class and there is no apparent difference between FR1 and FR2. Accordingly, the difference image in FIG. 6b is a blank-image with negligible error pixels.

FIG. 7 represents an analysis of blobs comprising one or more error pixel or while pixels with respect to the difference image for determination of data capturing condition index corresponding to steps 104 and 106. The white blobs are located in the image, for example through the application of connected component analysis. An overall index is computed based on the number of blobs and their size. In an example, the overall index lies between 0 and 1 and defined by:

$$\frac{\text{Number of Pixels part of a blob}}{\text{total number of pixel}}$$

Another example index is Lighting index which is based on large blobs number and dimensions if width>threshold, if height>threshold. Lighting index is denoted by:

$$\frac{\text{Number of pixel part of blob}}{\text{total number of pixels}}$$

Accordingly, the lighting-index is defined by a ratio of a number of large blobs and the total number of pixels, said large blob defined by a height and width above a pre-defined threshold. Yet another example index is alignment index which is based on narrow blobs number and dimensions such that with respect to the blob, width is greater than a threshold 1 and height is less than a threshold 2. Accordingly, the alignment index is defined by a ratio of a number of narrow blobs and the total number of pixels. The narrow blob is defined by a height and width below a pre-defined threshold. The alignment index may be represented by:

$$\frac{\text{Number of Pixels within a blob}}{\text{Total Number of Pixels}}$$

In an example, the overall index may also be represented as:

Lighting index+Alignment index+pixels in other blobs−the intersection of (lighting index, alignment index)

In an example, the aforesaid indexes may be calculated, for example, based on application of a plurality of AI or ML techniques. In other example, a plurality of deep learning techniques may be used for calculation of indexes. For the data capturing conditions such as a misaligned condition or difference in lighting conditions, the indexes as determined above are compared against various thresholds or tolerance values. If blobs are located near the edge, the system proposes to refine the alignment. If blobs are spread across a wide area, this indicates differences in lighting conditions.

As a precursor to such comparison, each of the FR1 image and the FR2 image are evaluated for recommending one or more image features within the FR1 image and the FR2 image.

The evaluation begins with detecting a plurality of interest-points within each of the FR1 and FR2 image. For example, with respect to FR1 (class 1) and FR2 (class 2), the interest points are extracted by a feature descriptor D. The point p1 detected in image FR1 is repeated in image FR2 if the corresponding point p2 is detected in image FR2.

Thereafter, a repeatability rate is determined with respect to the detected plurality of interest points with respect to the FR1 and FR2 image, said repeatability rate defining a geometrical stability criteria. A sub-plurality of interest-points corresponding to said repeatability-rate is ascertained with respect to the FR1 and FR2 image. In other words, using repeatability rate, the percentage of detected points are checked that are repeated in both median images which explicitly describes the geometrical stability of the interest point detector between different images of a given scene taken under varying conditions.

Thereafter, the sub-plurality of interest points are identified as one or more image-features defined by one or more of corners, edges, ridges in accordance with a standard library of key-point features. Then, the information gain is applied to measure the distinctiveness of the descriptors' features.

In an accordance with an example scenario for pursuing the aforesaid evaluation of FR1 and FR2 images, a software (SW) may be executed with a library of key-point features such as SIFT, SURF, FAST, BRIEF, ORB, etc. At least an objective may be to estimate the best feature to be used for the dataset. An example method/algorithm steps (1-5) may be provided as follows Step 1: Extract Feature for images in Class 1 corresponding to FR1

Step 2: Repeat Step 1 for images in Class 2 corresponding to FR2

Step 3: Check quality of the key point detections
i. Step 3*i*: Compute standard deviation of key point j for images in Class 1
- j=1 to N, N is the total number of key points detected in an image
- lesser standard deviation shows stability of the feature
ii. Step 3*ii*: Repeat step for images in Class 2
iii. Step 3*iii*: Compute RMSE between key-point j for images in Class 1 & Class 2
- lesser RMSE shows repeatability of the feature Step 4: Repeat 1-3 for all features (SIFT, SURF, FAST, BRIEF, ORB, etc.)

Step 5: Finalize feature giving least values for STD & RMSE

Now for detecting alignment issues, a spread of blobs within the difference image is analyzed as below a pre-defined threshold and existent along one of the identified interest point. The alignment quality index with respect to either one of the FR1 image or the FR2 image is detected as "above tolerance" based on the analysis of the spread of blobs and thereby misalignment is established.

Now for detecting difference in lighting issues, a spread of blobs within the difference image is analyzed as above a pre-defined threshold and existent along one of the identified interest point. The lighting index or an illumination quality index with respect to either one of the FR1 image or the FR2 image is detected as "above tolerance" value based on the analysis of the spread of the blobs and thereby difference of lighting is established.

Alternatively, if blobs are located near the edge, the present system detects misalignment and proposes refining the alignment. If blobs are spread across a wide area, this indicates differences in lighting conditions.

In another example, the present subject matter may be construed to detecting a blur quality index with respect to either one of the FR1 image or the FR2 image as above a tolerance based on the analysis of the spread of the blobs. The detected blur may be later corrected based on the state of the art techniques such as refocussing of the cameras by the operator for capturing images.

Figure 8B:
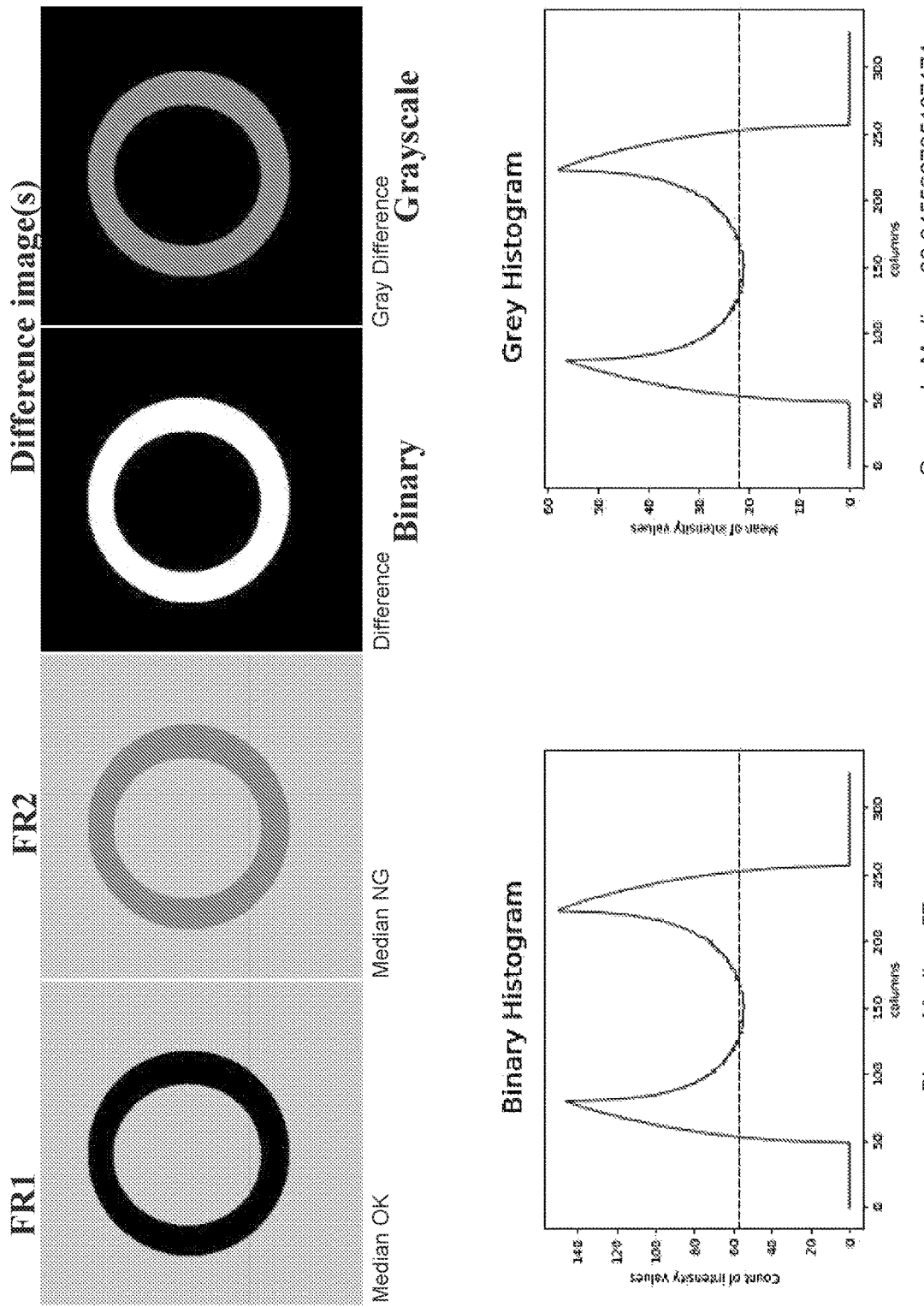

FIG. 8A and FIG. 8B represent an alternate embodiment for detecting the misalignment or difference in lighting as data capturing conditions. The determination of the index representing a difference of data-capturing conditions with respect to the binary-image and grayscale-image comprises calculating a difference in illumination based index between the FR1 image and the FR2 image. At least an aim is to detect difference in illumination between the OK and NG median image. A global spread of the error points or white pixels after binarization of the difference between the median images FR1 and FR2 of the two classes may be observed.

In operation, a number of error points per column in the binary image are counted and thereby a median of count of a high intensity per column is for the binary image. Further, a mean intensity per column in the greyscale image is calculated and thereby a median of mean intensity per column is calculated for the greyscale image. The calculated medians of the binary image and grayscale image are defined as the difference in illumination index.

A difference in illumination in either of the FR1 image or the FR2 image is ascertained if the calculated difference in illumination index is above a pre-defined threshold. On other hand, a misaligned condition is ascertained in either of the FR1 image or the FR2 image based on at least one of: a) the difference in illumination index being below a pre-defined threshold and b) the computed overall index in FIG. 7 being above a pre-defined threshold, thereby depicting an error.

Figure 9:
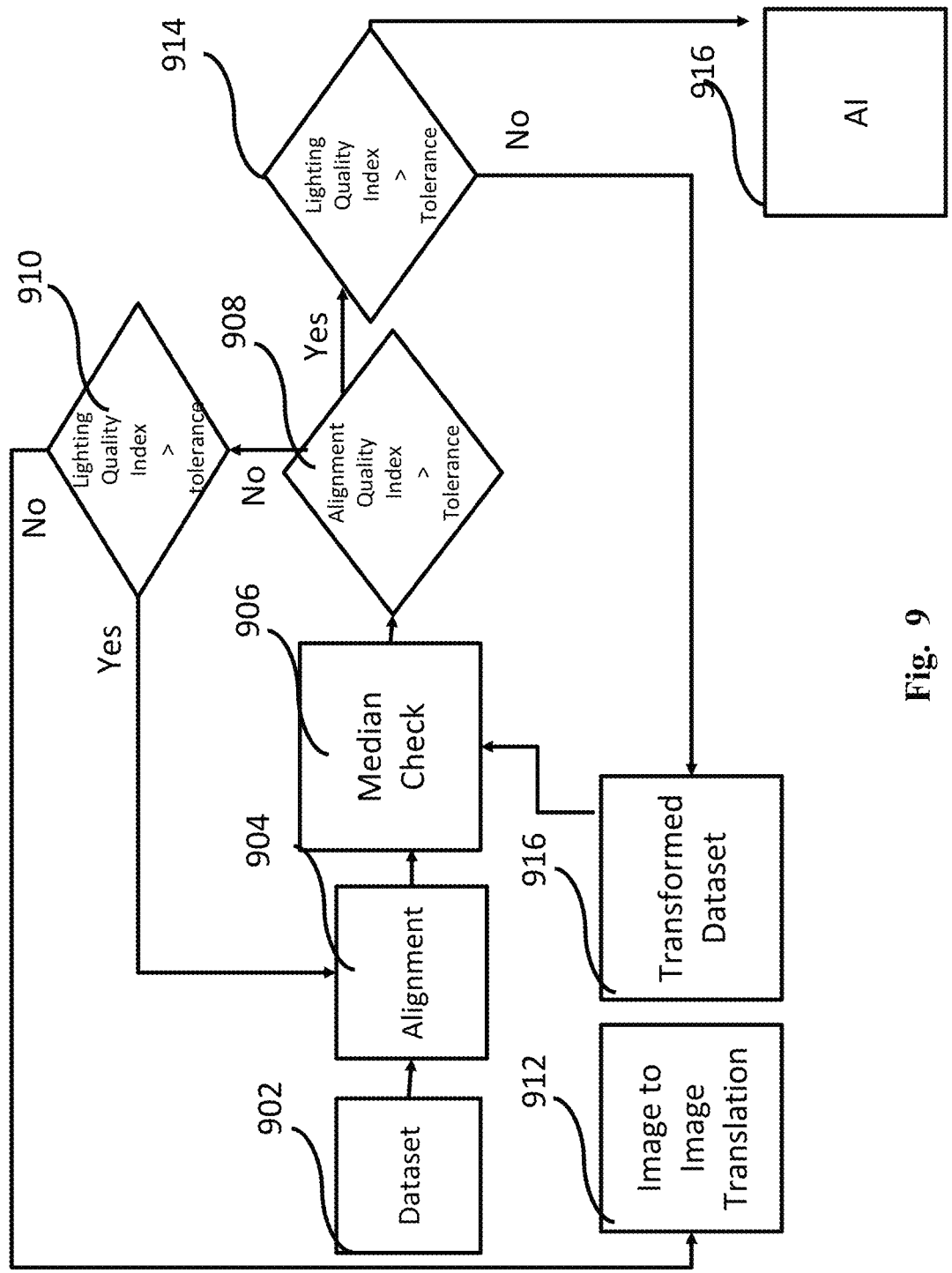
FIG. 9 the application of correction techniques as a part of an automatic alignment correction and lightening correction, in accordance with another embodiment of the present disclosure.

FIG. 9 illustrates the application of correction techniques as a part of an automatic alignment correction and lightening correction in accordance with steps 208 and steps 306.

Steps 902 to 906 correspond to steps 402 to 406 of FIG. 4.

Step 908 corresponds to the determination of misaligned condition based on a comparison of alignment index with tolerance in accordance with FIG. 7. As may be understood, if the spread of the blobs after binarization of the difference between the median images of the two classes is low and prominent along the edge, alignment corrective measurement takes place. Substantial differences in camera settings of the two image classes may lead to such misalignment in one of the class.

Step 910 corresponds to the determination of the difference in illumination condition based on the comparison of lighting index with tolerance in accordance with FIG. 7. Such determination is based on the spread of the blobs after binarization of the difference between the median images of the two classes is high and prominent along the edge. In such a scenario, alignment may also fail due to the variation in lighting conditions.

In case only the condition of step 908 is not satisfied but that of step 910 is satisfied then, the control flow process proceeds back to step 904 to correct alignment. However, in case the condition of both step 908 are not satisfied, then control transfers to step 912 to correct both the lighting issues coupled the misalignment together.

As a part of alignment correction at step 904, one or more scale invariant image features are extracted from one of the FR1 image or the FR2 image in intensity space. In an example, scale-invariant feature detector and descriptor may be employed to extract the gradient-features in intensity-space. The one or more scale invariant image-features are mapped with a plurality of correspondence interest-points determined based on a deep-learning criteria and applied over one or more of the FR1 image or the FR2 image. In an example, the brute force nearest-neighbours approach may be employed to match the correspondence interest points and align the image using the correspondence interest points. Based thereupon, one of the FR1 image or the FR2 image is aligned using the correspondence interest points.

At step 912, the detected illumination variation is automatically corrected for a misaligned FR1 image or a misaligned FR2 image based on deep learning-enabled image to image translation techniques, said translation techniques configured to capture characteristic of the lightning condition pertaining to one group of images and reconstruct it to other group of images. The same has been further referred in example embodiment defined in FIG. 10.

After step 912, the control again transfers to step 906 and then to step 908. If the condition in step 908 is now satisfied and the dataset is now deemed aligned, the control transfers to step 914.

Step 914 corresponds to the determination of the difference in illumination condition for the aligned data set based on the comparison of lighting-index with tolerance in accordance with FIG. 7. In case the condition of step 914 is not satisfied, then control transfers to step 916 to correct both the lighting issues. The substantial difference in lighting conditions for images of two classes is observed based on analyzing that spread of the blobs after binarization of the difference between the median images of the two classes is high.

At step 916, the detected illumination variation for the FR1 image or an FR2 image corresponding to an aligned dataset is automatically corrected. With respect to a particular image in class 2 which refers the second group of images, a difference between the FR1 image and the particular image under consideration is computed to yield another difference image. A plurality of blobs are located within the another difference image, each of said blob representing the group of white pixels within the another difference image. The blobs as located are indexed in terms of regions. For a particular blob region (e.g. region i in the difference image), a difference is calculated between the region of the FR1 image and the region of the particular image of the second group of images. A pixel value for particular region under consideration is varied for the particular image of the second group of images, if the computed difference as calculated is greater than a tolerance value. Such variation of the pixel value for the particular image under consideration is executed till the computed difference for the blob under consideration is less than the tolerance value. Thereafter, the steps of locating, computing, varying of the pixel value are repeated for the next image pertaining to the second group of images or the class 2 for eventually correcting the illumination in the aligned FR2 image.

An example algorithm steps 1 to 7 underlying step 916 may be executed for each image in class 2 as corresponding to FR2 as follows:

For each image in class 2:
Step 1: Median(class 1)—sample image of class 2—
Step 2: Binarize difference image
Step 3: Segment out and index regions of large blobs sequentially (1,2, . . . N)
Step 4: For blob region i, compute Median(Class 1, region i)—sample image of class 2(region i)
Step 5: If difference(region i)>tolerance, increment/decrement pixel value of region i for the sample image of Class 2 (assuming illumination is to standardized to Class 1)
Step 6: Repeat steps 5 until difference of region i is less than threshold
Step 7: Repeat steps 4 to 6 for blob regions 1 to N
Repeat steps 1 to 7 for next image of class 2

In another example, step 916 may be construed to automatically correcting a blur quality based on the detected blur quality index for one of the FR1 image or the FR2 image. For such purposes, the cameras may be refocused by the operator for correcting the blur.

After the lighting correction is performed in step 916, the control transfers back to the step 906. Once the conditions of the steps 908, 914 are satisfied then the corrected and compensated dataset (e.g. light compensated dataset) is passed to step 918 for automatic visual inspection.

The present subject matter renders a support for data collection by enabling a check that data collected on different days will be useful. The same may be done daily as a part of the correction of the data collection condition and labelling of dataset may not be required.

In case of data check requirement before A.I. training phase, labelling of the dataset may be required prior to undertaking the operation of the present subject matter. Thereafter, the dataset may be saved.

As a part of system maintenance after deployment, the present subject matter may be appropriated to compare the current condition with the one during data collection. For example, after a few years, the hardware issues may be detected without disturbing the factory line production. In such a scenario, the dataset may be either corrected or undergo re-training, or both may hold applicable.

Figure 10:
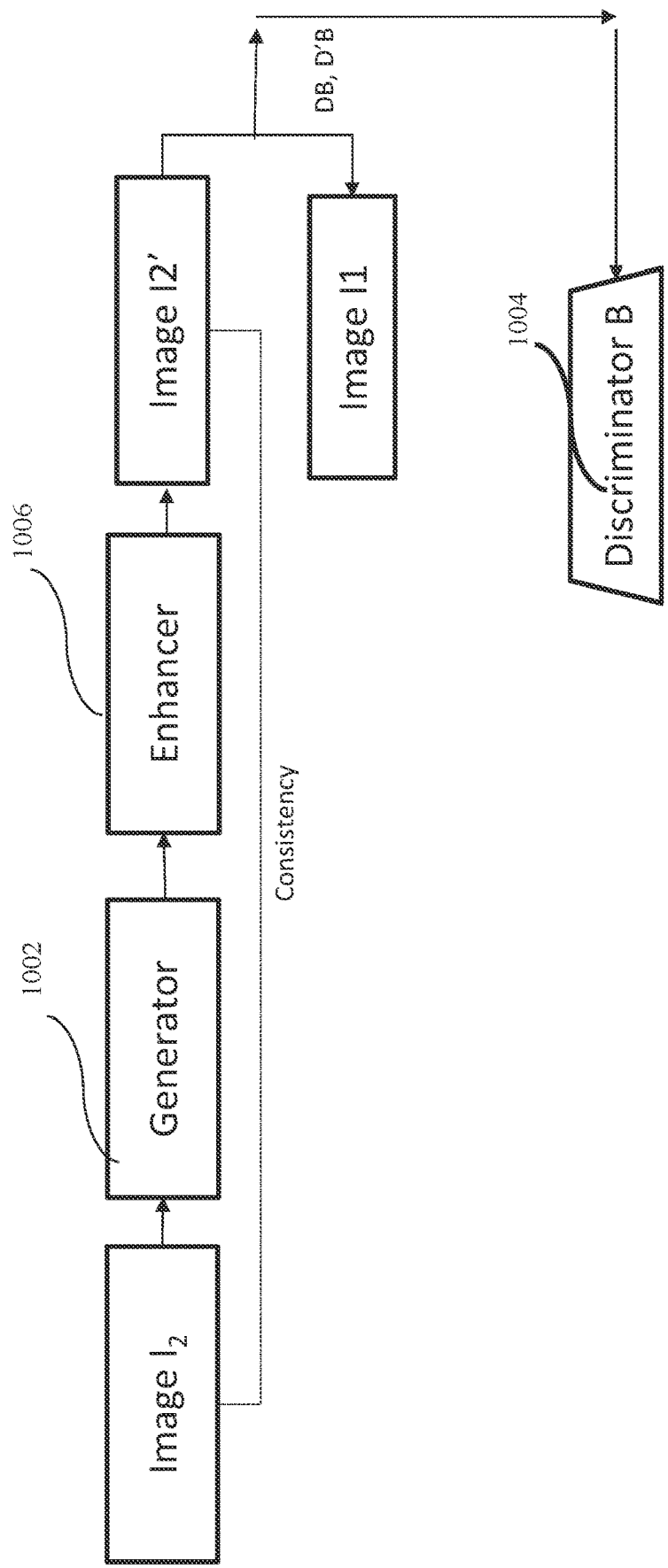
FIG. 10 illustrates an example image to image translation techniques in accordance with another embodiment of the present disclosure.

FIG. 10 illustrates an example image to image translation techniques in accordance with step 912 as a part of automatic lighting correction.

For instance, image with ideal lighting may be $I_1$, and image with non-ideal lighting may be $I_2$ Non-ideal lighting image is converted to ideal lighting image $I_2'$. At least an objective is to identify a mapping function (F) using Deep Learning methods to convert any non-ideal lighting image to ideal lighting. Accordingly, a final target or the ideal lighting image $I_2'$ is $F \cdot I_2$, where F is a mapping function learned using training image pairs $(I_1, I_2)$ such that $I_2 = F \cdot I_1$.

Using Image to Image translation techniques, the lightning condition of FR1 image is captured and these characteristics are translated to generate and enhance the quality of images corresponding to FR2.

An example image to image translation module based on generator adversarial network (GAN) is composed of example three components depicted as follows.

Generator 1002: An encoder-decoder model comprises standardized blocks of convolutional, activation layers, dropout, batch normalization. etc. which enables the generator to learn and generate reasonable images in the target domain class.

Discriminator 1004: A deep convolutional neural network is used to classify the generated image or fake image. Discriminator determines whether the generated image is a plausible transformation of the original image.

Enhancer 1006: A deep model based on the receptive field is used to reinforce the fine scales and enhance the lighting condition of the generated images while preserving the structure of the original image.

FIG. 11 illustrates an implementation of the system as illustrated in FIG. 4 till 9 in a computing environment. The present figure essentially illustrates the hardware configuration of the system. The computer system 1400 can include a set of instructions that can be executed to cause the computer system 1400 to perform any one or more of the methods disclosed. The computer system 1400 may operate as a standalone device or may be connected, e.g., using a network, to other computer systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1400 is illustrated, the term "system" shall also be taken to include any collection of systems or sub-systems that individually or jointly execute a set, or multiple sets, of instructions to perform one or more computer functions.

The computer system 1400 may include a processor 1402 (e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404, such as a memory 1404 that can communicate via a bus 1408. The memory 1404 may be a main memory, a static memory, or a dynamic memory. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1404 includes a cache or random access memory for the processor 1402. In alternative examples, the memory 1404 is separate from the processor 1402, such as a cache memory of a processor, the system memory, or other memory. The memory 1404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1404 is operable to store instructions executable by the processor 1402. The functions, acts or tasks illustrated in the figures or described may be performed by the programmed processor 1402 executing the instructions stored in the memory 1404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1400 may or may not further include a display unit 1410, such as a liquid crystal display (LCD), an organic light emitting diode (OLED), a flat panel display, a solid state display, a cathode ray tube (CRT), a projector, a printer or other now known or later developed display device for outputting determined information. The display 1410 may act as an interface for the user to see the functioning of the processor 1402, or specifically as an interface with the software stored in the memory 1404 or in the drive unit 1416.

Additionally, the computer system 1400 may include an input device 1412 configured to allow a user to interact with any of the components of system 1400. The input device 1412 may be a number pad, a keyboard, or a cursor control device, such as a mouse, or a joystick, touch screen display, remote control or any other device operative to interact with the computer system 1400.

The computer system 1400 may also include a disk or optical drive unit 1416. The disk drive unit 1416 may include a computer-readable medium 1422 in which one or more sets of instructions 1424, e.g. software, can be embedded. Further, the instructions 1424 may embody one or more of the methods or logic as described. In a particular example, the instructions 1424 may reside completely, or at least partially, within the memory 1404 or within the processor 1402 during execution by the computer system 1400. The memory 1404 and the processor 1402 also may include computer-readable media as discussed above.

The present invention contemplates a computer-readable medium that includes instructions 1424 or receives and executes instructions 1424 responsive to a propagated signal so that a device connected to a network 1426 can communicate voice, video, audio, images or any other data over the network 1426. Further, the instructions 1424 may be transmitted or received over the network 1426 via a communication port or interface 1420 or using a bus 1408. The communication port or interface 1420 may be a part of the processor 1402 or may be a separate component. The communication port 1420 may be created in software or may be a physical connection in hardware. The communication port 1420 may be configured to connect with a network 1426, external media, the display 1410, or any other components in system 1400 or combinations thereof. The connection with the network 1426 may be a physical connection, such as a wired Ethernet connection or may be established wirelessly as discussed later. Likewise, the additional connections with other components of the system 1400 may be physical connections or may be established wirelessly. The network 1426 may alternatively be directly connected to the bus 1408.

The network 1426 may include wired networks, wireless networks, Ethernet AVB networks, or combinations thereof. The wireless network may be a cellular telephone network, an 802.11, 802.16, 802.20, 802.1 Q or WiMax network. Further, the network 1426 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 1400.

At least based on the aforesaid features, the present subject matter renders an automatic check that different classes were collected under the same lighting condition, an automatic check that the alignment is correct for each object, an automatic check that the zooming factor is correct and compensates difference in lighting condition.

The present subject matter is able to detect variations across multiple image, and not just within the same sample. The present subject matter focuses on slight camera variations, lighting changes etc. The present subject matter includes corrective steps specific to machine learning: Light correction, scaling corrections etc.

In an example, as a part of automatic alignment correction, if issues are detected at the alignment due to size of the object, the present subject matter suggests features that are less sensitive to such variations. In other examples, as a part of Automatic Lighting Correction, the present subject matter ensures that the datasets are useable for training and the model learns to detect defects. It minimizes the impact of data collected in varying conditions.

Terms used in this disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms or both terms. For example, the phrase "A or B" should be understood to include the possibilities of "A" or "B" or "A and B."

All examples and conditional language recited in this disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that various changes, substitutions, and alterations could be made thereto without departing from the spirit and scope of the present disclosure.

The invention claimed is:

1. A method for checking data gathering conditions associated with image data during artificial intelligence (AI) based visual-inspection process, said method comprising:
   generating a first representative (FR1) image for a first group of images and a second representative image (FR2) for a second group of images;
   generating a difference image data between the FR1 image and the FR2 image based on calculating a difference between luminance values of pixels with same coordinate values;
   determining one or more of a plurality of white pixels or intensity-values within the difference image data based on acquiring difference image data formed of luminance difference values of pixels; and
   determining an index representing difference of data-capturing conditions across the FR1 image and the FR2 image, said index determined at least based on the plurality of white pixels or intensity-values,
   wherein the determination of the index with respect to a binary image acting as the difference image data comprises computing an overall index based on a ratio of a number of white pixels forming part of a blob and a total number of pixels within the binary image, said overall index comprising:
   a lighting-index defined by a ratio of a number of large blobs and the total number of pixels, said large blob defined by a height and width above a pre-defined threshold; and an alignment index defined by a ratio of a number of narrow blobs and the total number of pixels, said narrow blob defined by a height and width below a pre-defined threshold.

2. The method as claimed in claim 1, wherein the FR1 image and the FR2 image are generated from an aligned dataset defined by median-images of the first and second groups of images, respectively, and wherein the FR1 image and the FR2 image represent either an entire object or region of interest (ROI).

3. The method as claimed in claim 1, wherein determining the plurality of white pixels or intensity values comprises at least one of:
  locating a white pixel as at least one error pixel in the binary image acting as the difference image data; and
  locating an intensity region in a grayscale image acting as the difference image data.

4. The method as claimed in claim 3, wherein the determination of the index representing difference of data-capturing conditions with respect to the binary image and grayscale image comprises:
  calculating a difference in illumination based index between the FR1 image and the FR2 image based on at least one of:
  counting a number of error points per column in the binary image and thereby calculating a median of count of a high intensity per column of the binary image;
  calculating a mean intensity per column in the grayscale image and thereby calculating a median of mean intensity per column for the grayscale image;
  defining calculated medians of the binary image and grayscale image as the difference in illumination based index;
  ascertaining a difference in illumination in either of the FR1 image or the FR2 image if the difference in illumination based index is above a pre-defined threshold; and
  ascertaining a misaligned condition in either of the FR1 image or the FR2 image based on:
  the difference in illumination based index being below a pre-defined threshold; and
  the computed overall index being above a pre-defined threshold and thereby depicting an error.

5. The method as claimed in claim 1, further comprising evaluating each of the FR1 image and the FR2 image for recommending one or more image features within the FR1 image and the FR2 image, said evaluation comprising:
  detecting a plurality of interest points within each of the FR1 and FR2 image and thereby determine a repeatability rate with respect to the detected plurality of interest points with respect to the FR1 and FR2 image, said repeatability rate defining a geometrical stability criteria;
  further ascertaining a sub-plurality of interest points corresponding to said repeatability rate with respect to the FR1 and FR2 image; and
  identifying the sub-plurality of interest points as one or more image features defined by one or more of corners, edges, and ridges in accordance with a standard library of key-point features.

6. The method as claimed in claim 5, further comprising:
  analysing a spread of blobs within the difference image data as below a pre-defined threshold and existent along one of the plurality of interest points, each blob representing a group of white pixels within the difference image data;
  detecting an alignment quality index with respect to either one of the FR1 image or the FR2 image as an above tolerance based on the analysis of the spread of blobs; and
  automatically correcting a detected misalignment for one of the FR1 image or the FR2 image.

7. The method as claimed in claim 6, automatically correcting the detected misalignment based on the steps of:
  extracting one or more scale invariant image features from one of the FR1 image or the FR2 image in intensity space;
  mapping the one or more scale invariant image features with a plurality of correspondence interest points determined based on a deep learning criteria applied over one or more of the FR1 image or the FR2 image;
  aligning one of the FR1 image or the FR2 image using the correspondence interest points.

8. The method as claimed in claim 5, further comprising:
  analysing a spread of blobs within the difference image data as above a pre-defined threshold and existent along one of the plurality of interest points, each blob representing a group of white pixels within the difference image data;
  detecting an illumination quality index with respect to either one of the FR1 image or the FR2 image as an above tolerance value based on the analysis of the spread of the blobs; and
  automatically correcting a detected illumination variation based on the illumination quality index for one of the FR1 image or the FR2 image.

9. The method as claimed in claim 8, wherein the detected illumination variation is automatically corrected for a misaligned FR1 image or a misaligned FR2 image based on deep learning enabled image to image translation techniques, said translation techniques configured to capture a characteristic of a lightning condition pertaining to one group of images and reconstruct it to another group of images.

10. The method as claimed in claim 8, wherein the detected illumination variation for the FR1 image or an FR2 image corresponding to an aligned dataset is automatically corrected based on the steps of:
  computing a difference between the FR1 image and a particular image under consideration to yield another difference image;
  locating a plurality of blobs within the another difference image, each blob representing a group of white pixels within the another difference image;
  for each blob region corresponding to the another difference image, computing a difference between the FR1 image and a particular image of the second group of images;
  varying a pixel value for a blob region under consideration for the particular image of the second group of images if a computed difference for the blob region under consideration is greater than a tolerance value;
  executing the varying of the pixel value until the computed difference for the blob region under consideration is less than the tolerance value; and
  re-executing the steps of locating and varying of a pixel value for a next image of the second group of images and thereby correcting illumination variation for the FR2 image.

11. A method correcting image data based on checking data gathering conditions associated with image data during AI based visual-inspection process, said method comprising:

generating a first representative (FR1) image for a first group of images and a second representative image (FR2) for a second group of images;

generating a difference image data between the FR1 image and the FR2 image based on calculating a difference between luminance values of pixels with same coordinate values;

determining one or more of a plurality of white pixels or intensity-values within the difference image data based on acquiring difference image data formed of luminance difference values of pixels;

determining an index representing difference of data-capturing conditions across the FR1 image and the FR2 image, said index determined at least based on the plurality of white pixels or intensity-values; and automatically correcting for one of the FR1 image or the FR2 image, based on the determined index, at least one of:
 a detected misalignment;
 a detected illumination variation within aligned or misaligned images; and
 a detected blur, wherein the correcting of the detected misalignment comprises:

analysing a spread of blobs within the difference image data as below a predefined threshold and existent along an identified interest point, each blob representing a group of white pixels within the difference image data;

detecting an alignment quality index with respect to either one of the FR1 image or the FR2 image as above tolerance based on the analysis of the spread of blobs; and automatically correcting the detected misalignment for one or more images corresponding to classes of either the FR1 image or the FR2 image.

12. The method as claimed in claim 11, wherein the automatically correcting the detected misalignment is based on the steps of:

extracting one or more scale invariant image features from one of the FR1 image or the FR2 image in intensity space;

mapping the one or more scale invariant image features with a plurality of correspondence interest points determined based on a deep learning criteria applied over one or more of the FR1 image or the FR2 image;

aligning one or more of images corresponding to the classes of either the FR1 image or the FR2 image using the correspondence interest points.

13. The method as claimed in claim 11, wherein the correction of the detected illumination variation comprises:

analysing a spread of blobs within the difference image data as above a predefined threshold and existent along an identified interest point, each blob representing a group of white pixels within the difference image data;

detecting an illumination quality index with respect to either one of the FR1 image or the FR2 image as being above tolerance value based on the analysis of the spread of the blobs; and automatically correcting the detected illumination variation based on the illumination quality index for one or more of images corresponding to classes of either the FR1 image or the FR2 image.

14. The method as claimed in claim 13, wherein the detected illumination variation is automatically corrected for one or more of misaligned images corresponding to the classes of either the FR1 image or the FR2 image based on deep learning enabled image to image translation techniques, said translation techniques configured to capture characteristic of a lightning condition pertaining to one group of images and reconstruct it to another group of images.

15. The method as claimed in claim 13, wherein a detected illumination variation for the FR1 image or an FR2 image corresponding to an aligned dataset is automatically corrected based on the steps of:

computing a difference between the FR1 image and a particular image under consideration to yield another difference image;

locating a plurality of blobs within the another difference image, each blob representing a group of white pixels within the another difference image;

for each blob region corresponding to the another difference image, computing a difference between the FR1 image and a particular image of the second group of images;

varying a pixel value for a blob region under consideration for the particular image of the second group of images if a computed difference for the blob region under consideration is greater than a tolerance value;

executing the varying of the pixel value until the computed difference for the blob region under consideration is less than the tolerance value; and re-executing the steps of locating and varying of a pixel value for a next image of the second group of images.

16. A method for correcting illumination-variation conditions associated with image data during artificial intelligence (AI) based visual-inspection process, said method comprising:

generating a first representative (FR1) image for a first group of images and a second representative image (FR2) for a second group of images;

generating a difference image data between the FR1 image and the FR2 image based on calculating a difference between luminance values of pixels with same coordinate values;

detecting an illumination variation for the FR2 image;

computing a difference between the FR1 image and a particular image of the second group of images to yield another difference image;

locating a plurality of blobs within the another difference image, each blob representing a group of white pixels within the another difference image;

for each blob region corresponding to the another difference image, computing a difference between the FR1 image and the particular image of the second group of images;

varying a pixel value for a blob region under consideration for the particular image of the second group of images if a computed difference for the blob region under consideration is greater than a tolerance value;

executing the varying of the pixel value until the computed difference for the blob region under consideration for the particular image of the second group of images is less than the tolerance value; and re-executing the steps of locating and varying of a pixel value for a next image of the second group of images and thereby correcting illumination variation for the FR2 image.

17. The method as claimed in claim 16, further comprising:

automatically correcting illumination variation for one or more of misaligned images corresponding to classes of either the FR1 image or the FR2 image based on deep learning enabled image to image translation techniques, said translation techniques configured to capture a characteristic of a lightning condition pertaining to one group of images and reconstruct it to another group of images.

\* \* \* \* \*